(12) United States Patent
Mons

(10) Patent No.: US 6,388,962 B1
(45) Date of Patent: *May 14, 2002

(54) DISC-LIKE RECORD CARRIER, RECORDING AND/OR READING APPARATUS FOR RECORDING/READING INFORMATION IN THE RECORD CARRIER

(75) Inventor: Johannes J. Mons, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/558,517

(22) Filed: Nov. 16, 1995

(30) Foreign Application Priority Data

Nov. 18, 1994 (BE) .............................................. 09401044

(51) Int. Cl.⁷ .................................................. G11B 2/00

(52) U.S. Cl. .................... 369/44.26; 360/69; 360/73.03; 369/190; 369/239; 369/275.1; 369/44.29; 369/53.2; 369/53.37

(58) Field of Search ............................... 369/190, 239, 369/240, 275.1, 43, 44.27, 44.29, 54, 50, 58, 44.26, 53.1, 53.11, 53.2, 53.37, 53.45; 360/69, 71, 73.01, 73.03, 133, 135

(56) References Cited

U.S. PATENT DOCUMENTS

| | | | | |
|---|---|---|---|---|
| 4,190,860 A | * | 2/1980 | Somers | 369/240 |
| 4,530,018 A | * | 7/1985 | Hoshima | 360/72.1 |
| 4,675,855 A | * | 6/1987 | Iso | 369/32 |
| 4,707,818 A | * | 11/1987 | Suzuki | 369/59 |
| 4,789,975 A | * | 12/1988 | Taniyama | 369/50 |
| 5,042,025 A | * | 8/1991 | Aoyagi et al. | 369/239 X |
| 5,054,014 A | * | 10/1991 | Ito | 369/239 X |
| 5,136,560 A | * | 8/1992 | Hangai et al. | 369/32 |
| 5,218,453 A | * | 6/1993 | Hashimoto | 369/32 X |
| 5,432,766 A | * | 7/1995 | Ando | 360/73.03 X |

FOREIGN PATENT DOCUMENTS

| | | | |
|---|---|---|---|
| EP | 0325329 | 7/1989 | |
| EP | 0397238 | 11/1990 | |
| EP | 0546818 A1 | 6/1993 | |
| JP | 245061 | * 9/1992 | 360/73.03 |
| WO | WO9214247 | 8/1992 | |

* cited by examiner

Primary Examiner—Alan T. Faber

(57) ABSTRACT

A disc-like record carrier (1) has control information recorded. The control information comprises diameter information which is indicative of the diameter of the record carrier.

An information recording and/or reading apparatus involves a drive structure for rotatingly driving the disc-like record carrier. The apparatus includes a control unit which adapts the loop gain of a control loop for controlling the number of revolutions per minute of the record carrier in dependence on the control information recorded on the record carrier.

5 Claims, 1 Drawing Sheet

DISC-LIKE RECORD CARRIER, RECORDING AND/OR READING APPARATUS FOR RECORDING/READING INFORMATION IN THE RECORD CARRIER

FIELD OF THE INVENTION

The invention relates to a disc-like record carrier having a predefined diameter on which record carrier control information is recorded.

The invention likewise relates to an information recording and/or reading apparatus comprising a drive means for rotatingly driving a disc-like record carrier, and setting means for setting the apparatus in dependence on control information carried by the record carrier, and which apparatus comprises components whose behavior depends on the diameter of the record carrier.

BACKGROUND OF THE INVENTION

A record carrier and apparatus of the type set out in the opening paragraph are known, for example, from EP-A 0.325.329.

In this document an apparatus is described for recording and reading information in an optical record carrier of a writable type. During recording and/or reading, the speed of rotation of the record carrier is controlled in dependent on a measuring signal that is indicative of the linear scanning velocity, at a value at which the linear scanning velocity remains constant. The behavior of this speed control depends on the diameter of the record carrier. For that matter, the loop gain of the control loop and thus the bandwidth of the control strongly depends on the mass moment of inertia of the disc and thus strongly depends on the diameter of the disc.

SUMMARY OF THE INVENTION

It is an object of the invention to provide means which make it possible to utilize record carriers of different diameters, while a detrimental effect of the diameter of the record carrier on the behavior of the apparatus is counteracted.

According to a first aspect of the invention the record carrier of the type set out in the opening a paragraph is characterized in that the control information contains diameter information including an encoding of the diameter.

According to a second aspect of the invention the apparatus of the type set out in the opening paragraph is characterized in that the setting means comprise means for adapting the diameter-dependent behavior of said components in dependence on the control information.

These measures enable the behavior of the apparatus to be optimally adapted in a simple manner to the diameter of the record carrier.

BRIEF DESCRIPTION OF THE DRAWING FIGURES

Further embodiments for a record carrier and an apparatus according to the invention as well as advantages thereof will be further explained hereafter with reference to FIGS. 1 and 2, in which.

DESCRIPTION OF THE INVENTION

Figure 1:
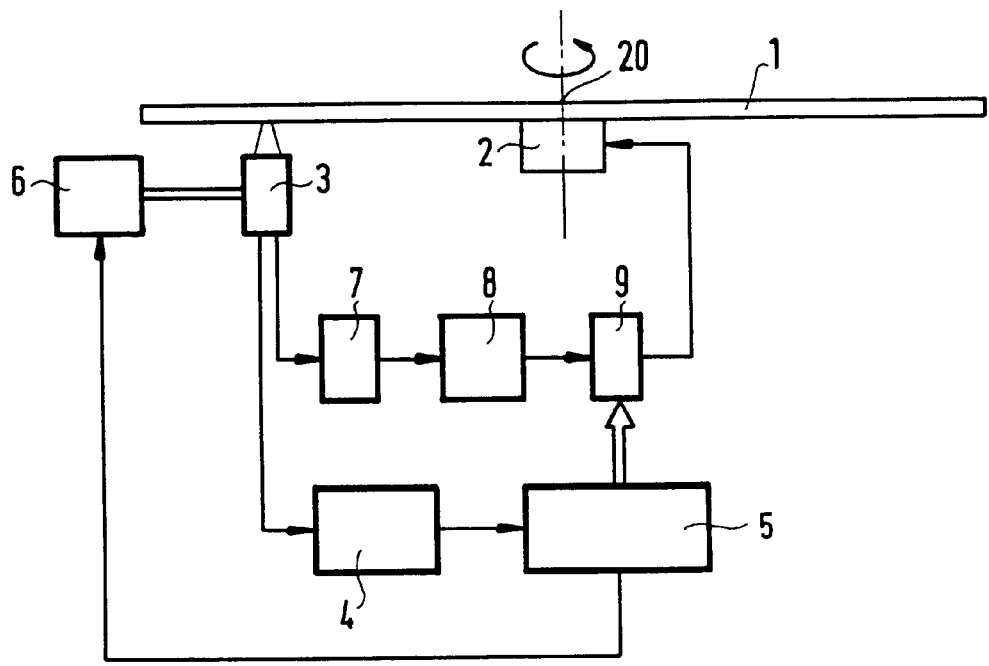
FIG. 1 shows an embodiment for an apparatus according to the invention.
Figure 2:
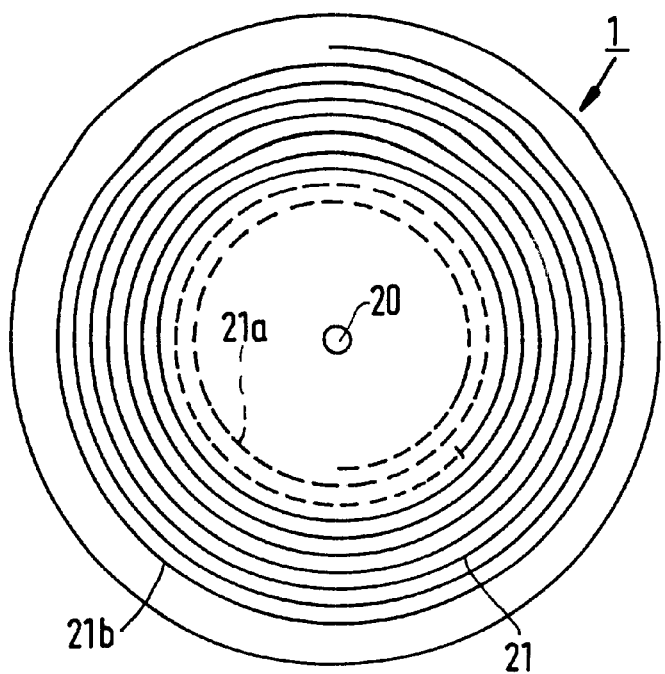
FIG. 2 shows a record carrier according to the invention.

FIG. 1 shows an embodiment for a recording and reading apparatus according to the invention. In this drawing Figure the reference character 1 denotes a round disc-like record carrier of a customary type, for example, a magnetic or optical type. A drive motor 2 rotates the record carrier 1 around a point of rotation 20 which substantially coincides with the center of the record carrier 1. Opposite to the rotating carrier 1 is arranged a read/write head 3 of a customary type for reading/recording information in the record carrier in a contact-free manner. The head 3 may be an optical head by which information can be recorded or read in an optical record carrier by means of a focused laser beam. The record carrier 1 carries control information which contains diameter information including an encoding of the diameter of the record carrier 1. Preferably, the control information is recorded on a predetermined position on the record carrier as is customary, for example, with so-termed Compact Discs whose control information is recorded in a so-termed lead-in area of the track. By way of illustration, FIG. 2 shows an embodiment for the record carrier 1 on which information is recorded in a helical track 21. The track comprises a so-termed lead-in area 21a indicated by a dashed line. In the lead-in area 21a is accommodated the control information. Furthermore, the track 21 contains a program area 21b in which program information is accommodated. When the record carrier 1 is played back, generally the control information in the lead-in area 21a is read first. Then, under the control of the control information, the program information in the program area 21b is read. Needless to observe that the diameter information may also be recorded at different places from that of the control information in the lead-in area on the record carrier 1.

The diameter information may be recorded, for example, in a so-called sub-code, recorded simultaneously with program information in time-multiplex mode.

The record carrier 1 may be of a writable type such as described in EP-A-0.397.238. The record carrier described in that document comprises a prearranged track intended for recording, which track presents a periodic track wobbling in radical direction of which the frequency is modulated in accordance with digital control information. The diameter information may then be included in the control information that modulates the frequency of the track wobbling.

The apparatus shown in FIG. 1 further includes a signal recovery unit 4 of a customary type, which recovers, in response to a signal produced by head 3, the information recorded on a part of the record carrier 1 scanned by the head 3. The information recovered by the unit 4 is fed to a control unit 5.

This control unit comprises control means of a customary type for controlling a search process for searching for information determined by an address or position on the record carrier. For this purpose, the control unit is coupled to a displacement unit 6 for displacing the head 3 in radial direction relative to the record carrier 1.

The search process control per se is widely known and will therefore not be described in detail.

The apparatus further includes a control for controlling the speed of the record carrier 1. This control comprises a unit 7 for deriving a measuring signal that indicates whether the read speed corresponds to a desired speed. Such a measuring signal may be derived in a manner as described, for example, in the document EP-A 0.325.329 in which the derived of a measuring signal is described which signal is indicative of a different between the read linear velocity at which the record carrier is scanned and the desired linear velocity. If the rear linear velocity is lower than the desired linear velocity, this means that the number of revolutions per minute is too low and if the rear linear velocity is too high this means that the number of revolutions per minute is too high. It may be useful point out that the measuring signal may be derived in a number of ways, for example, by a tachometer or pulse disc coupled to the shaft of the motor.

The measuring signal produced by unit 7 is applied to control unit 8 of a customary type, for example, a control unit having a control characteristic that is a combination of a proportional, differentiating and integrating action. The control unit 8 derives from the measuring signal a control signal for the motor 2 which rotates the record carrier. This control signal is applied to the motor 2 via an amplifier circuit 9.

The bandwidth of the control loop formed by the elements 2, 3, 6, 7, 8 and 9 strongly depends on the loop gain of the control loop. This loop gain is in inverse proportion to the mass moment of inertia of the record carrier 1 relative to the rotation point 20. With equal thickness and composition of the record carrier, this mass moment of inertia is determined substantially completely by the diameter of the record carrier 1. The mass moment of inertia is then proportional to the third power of the diameter of the record carrier.

To adapt the loop gain, the amplifier circuit 9 comprises means known per se for adapting the gain of the amplifier circuit 9. The loop gain in the control loop may be maintained at an optimum level by setting the gain of the amplifier circuit 9 so that the quotient (K/J) of gain (K) and mass moment of inertia (J) is substantially the same for any diameter.

To determine the desired gain (K), the control unit 5 comprises means for searching for the diameter information and subsequently reading same in a customary manner. Subsequently, the control unit 5 derives the value for the gain from the diameter information read and the gain is set to this derived value. The gain may be derived in a great many different ways. For example, it is possible that a memory of the control unit 5 stores the appropriate gain values for different diameters. Alternatively, however, it is possible that the control unit 5 computes the value of the gain in response to the diameter information read.

Hereinbefore, the adaptation of the control of the speed of rotation has been described in dependence on the diameter information. It should be noted, however, that not only the behavior of the control of the speed of rotation, but also the behaviour of other components in the apparatus may dependent on the diameter of the record carrier. For example, the useful work range for displacing the head in radial direction is strongly linked with the diameter of the record carrier. When the displacement of the head 3 in radical direction is controlled, the diameter of the disc may then also be an important parameter. Needless to observe that the adaptation of the control of the displacement of head 3 to the diameter of the record carrier falls within the scope of the invention.

What is claimed is:

1. An information recording and/or reading apparatus comprising drive means for rotatingly driving a disk-like record carrier having a diameter, control information comprising diameter information including an encoding of the actual physical diameter of the disk-like record carrier being accommodated on the record carrier, components whose behavior depends on the diameter of the record carrier, and means for reading the diameter information and for setting the components in dependence on the diameter information and for adapting the diameter-dependent behavior of said components.

2. The apparatus as claimed in claim 1, including control means for controlling rotation caused by the drive means, are the setting means are arranged for adapting the control means in dependence on the diameter information.

3. A disk-like record carrier on which record carrier control information is recorded, said record carrier having a diameter, wherein the control information comprises diameter information including the actual physical diameter of said record carrier.

4. A record carrier in the form of a disk on which control information is recorded, said record carrier having a diameter, said control information comprising diameter information including an encoding of the actual physical diameter of the record carrier.

5. A record carrier as in claim 4, wherein said record carrier has information tracks on which said control information is recorded at a determined position.

* * * * *